(12) United States Patent
Shih et al.

(10) Patent No.: US 7,295,373 B2
(45) Date of Patent: Nov. 13, 2007

(54) POWER POLARIZATION BEAM COMBINER AND ITS APPLICATIONS IN FIBER COMMUNICATION

(75) Inventors: Chih-Tsung Shih, Hsinchu (TW); Chen-Bin Huang, Hsinchu (TW); Daniel Yen Chu, Hsinchu (TW); Yu-Chen Yu, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 608 days.

(21) Appl. No.: 10/845,093

(22) Filed: May 14, 2004

(65) Prior Publication Data

US 2005/0141893 A1 Jun. 30, 2005

(30) Foreign Application Priority Data

Dec. 26, 2003 (TW) .............................. 92137207 A

(51) Int. Cl.
*G02B 27/10* (2006.01)
*G02F 1/00* (2006.01)
*G02F 1/295* (2006.01)

(52) U.S. Cl. .................... 359/618; 359/322; 385/5; 398/82

(58) Field of Classification Search ................ 359/322, 359/247, 250, 618; 250/214.1; 385/5, 16–18; 398/82
See application file for complete search history.

(56) References Cited

U.S. PATENT DOCUMENTS

| 6,188,819 | B1 | 2/2001 | Kosaka et al. ............... 385/39 |
| 6,556,735 | B1 * | 4/2003 | Kato ........................... 385/14 |
| 6,707,597 | B2 * | 3/2004 | Hamada ..................... 359/321 |
| 2001/0012149 | A1 | 8/2001 | Lin et al. .................... 359/344 |
| 2002/0027696 | A1 * | 3/2002 | Baba et al. ................. 359/196 |
| 2003/0026526 | A1 * | 2/2003 | Trissel et al. ................. 385/18 |
| 2003/0227415 | A1 * | 12/2003 | Joannopoulos et al. ..... 343/754 |
| 2004/0170352 | A1 * | 9/2004 | Summers et al. ............ 385/16 |

OTHER PUBLICATIONS

Kosaka, Hideo, "Superprism Phenomena in Photonic Crystals: Toward Microscale Lightwave Circuits", Nov. 1999, Journal of Lightwave Technology, vol. 17, pp. 2032-2038.*

* cited by examiner

*Primary Examiner*—Scott J. Sugarman
*Assistant Examiner*—DaWayne A Pinkney
(74) *Attorney, Agent, or Firm*—Birch, Stewart, Kolasch & Birch, LLP

(57) ABSTRACT

This specification discloses a power polarization beam combiner and its applications in fiber communications. The power polarization beam combiner uses the photonic band gap formed in a photonic crystal to produce a left-hand material with a negative refractive index and high dispersion rate. Using such properties of the photonic crystal, several beams with different wavelengths and polarizations are combined and output to a common port.

15 Claims, 6 Drawing Sheets

POWER POLARIZATION BEAM COMBINER AND ITS APPLICATIONS IN FIBER COMMUNICATION

This Non-provisional application claims priority under 35 U.S.C. § 119(a) on Patent Application No(s). 092137207 filed in Taiwan on Dec. 26, 2003, the entire contents of which are hereby incorporated by reference.

BACKGROUND OF THE INVENTION

1. Field of Invention

The invention relates to a power polarization beam combiner used in fiber network systems and, in particular, to a power polarization beam combiner made of highly dispersive material with a negative refractive index and its applications in fiber network systems.

2. Related Art

With the increase of local network systems in metropolitan areas, one is forced to increase the number of wavelengths in order to transmit a huge amount of information. Therefore, the CWDM transceiver and CWDM receiver become important. As the transmission distance gets longer, a higher optical transmission power is imperative. In particular, the use of the EDFA and the Raman amplifier requires a good power combiner. It is mainly because the laser power is insufficient for long-distance transmissions. Thus, a set of EDFA or the Raman amplifier is often installed every 40 km to enhance the laser power. Nonetheless, as the fiber distance gets longer, the number of laser amplifiers also increases. This inevitably increases the cost for fiber equipment and maintenance.

Moreover, conventional amplifiers, it is either EDFA or Raman amplifier, mainly combine beams of different polarizations within the transmissible wavelength range to increase the transmitted optical signal power. This results in huge sizes for the conventional power combiners.

The U.S. Pat. No. 6,188,819 discloses a wavelength division multiplexing (WDM) device designed using a photonic crystal with a normal refractive index. Although it is successful in reducing the device size, it cannot combine beams of different polarizations.

SUMMARY OF THE INVENTION

In view of the foregoing, the invention provides power polarization beam combiner and shows its applications in fiber communications. The design of a WDM with a negative refractive index can effectively reduce the device size to achieve the goal of compact integration. At the same time, beams of perpendicular polarizations in several wavelengths can be combined into a common port for output.

The disclosed power polarization beam combiner utilizes a highly dispersive device, such as a photonic crystal. The photonic band gap thus formed produces left-hand and highly dispersive materials with a negative refractive index. Such properties combine the power of beams of several wavelengths and polarizations into a common output port.

Based upon this idea, the highly dispersive device is used in the power polarization beam combiner to couple optical signals in different wavelengths and polarizations. It can be used to increase the laser power for the laser amplifier in multi-wavelength fiber communications. Used in optical transmitting modules and receiving modules, the invention can minimize the device size to achieve the goal of compact integration.

BRIEF DESCRIPTION OF THE DRAWINGS

The invention will become more fully understood from the detailed description given hereinbelow illustration only, and thus are not limitative of the present invention, and wherein.

DETAILED DESCRIPTION OF THE INVENTION

The invention primarily uses the negative refractive index property of a highly dispersive device to couple optical signals in different wavelengths and polarizations. In the following, we use a photonic crystal as an example to explain the spirit of the invention.

Figure 1:
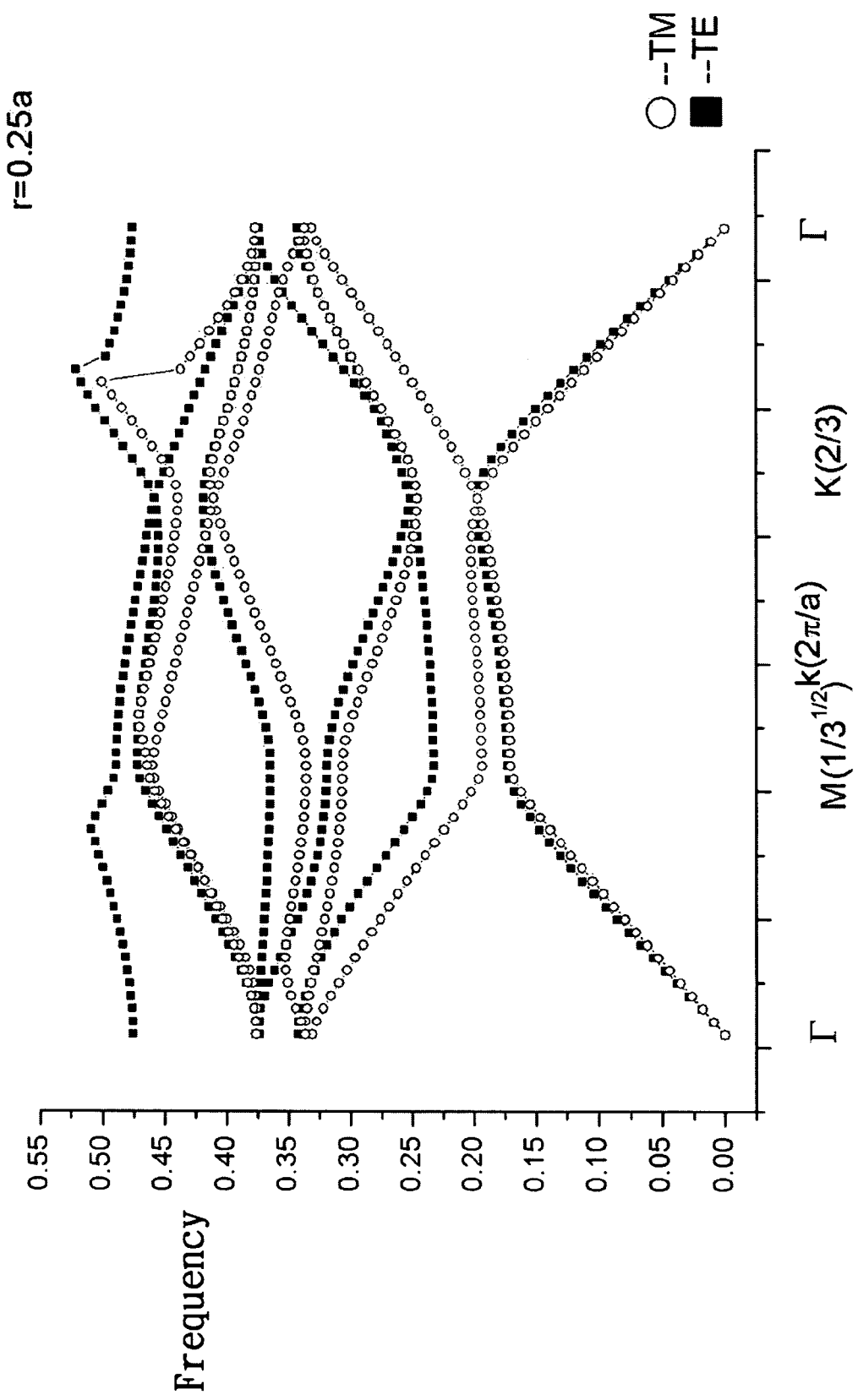
FIG. 1 shows the energy bands of a photonic crystal.
Figure 2:
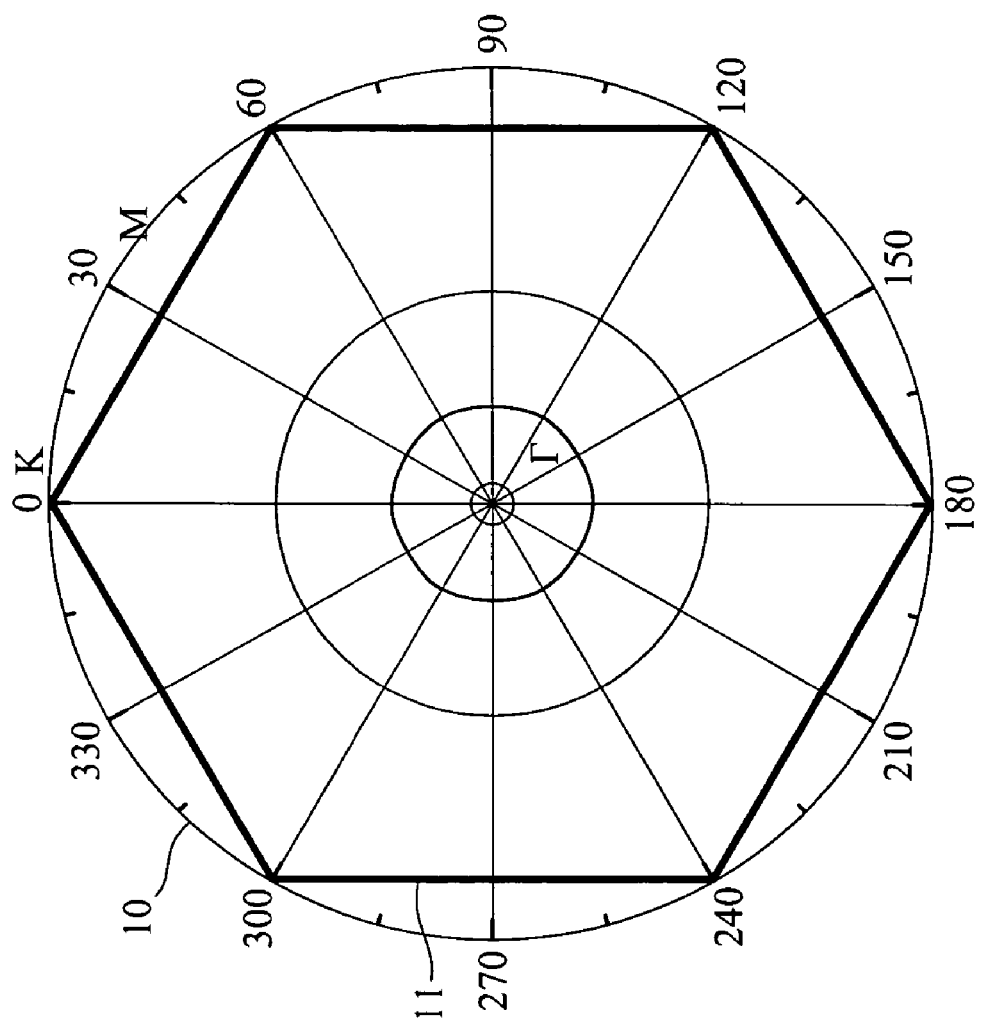
FIG. 2 shows the Brillion zone of a photon.

FIG. 1 shows the band gap of a photonic crystal. Each mode has two polarizations, the transverse electric field (TE) and the transverse magnetic field (TM). In the fundamental mode (its TE and TM being shown by the two curves at the bottom of the plot), the material looks the same as ordinary dielectric materials. The difference in the refractive indices of the two modes is tiny. However, with appropriate selections, one can obtain big refractive index difference in the TE and TM modes by exciting photons above the second band. As described in "Theory of light propagation in strongly modulated photonic band gap: Refraction-like behavior in the vicinity of the photonic band gap" (M. Notomi, Physical Review B), we know that as the operating frequency gets closer to the Brillouin Zone 11 (the point Γ, M, and K in FIG. 2 corresponding to the horizontal coordinates Γ in FIG. 1) of the photonic crystal 10, its energy direction and phase velocity will be parallel to each other. Therefore, in practice, one only needs to determine the direction of the wave number in order to figure out the energy direction. According to the paper, the slope of the band determines whether the photonic crystal is a right-material or a left-material and which band has a positive or negative refractive index. Consequently, one can readily obtain a photonic crystal with a negative refractive index through careful band selection.

Figure 3A:
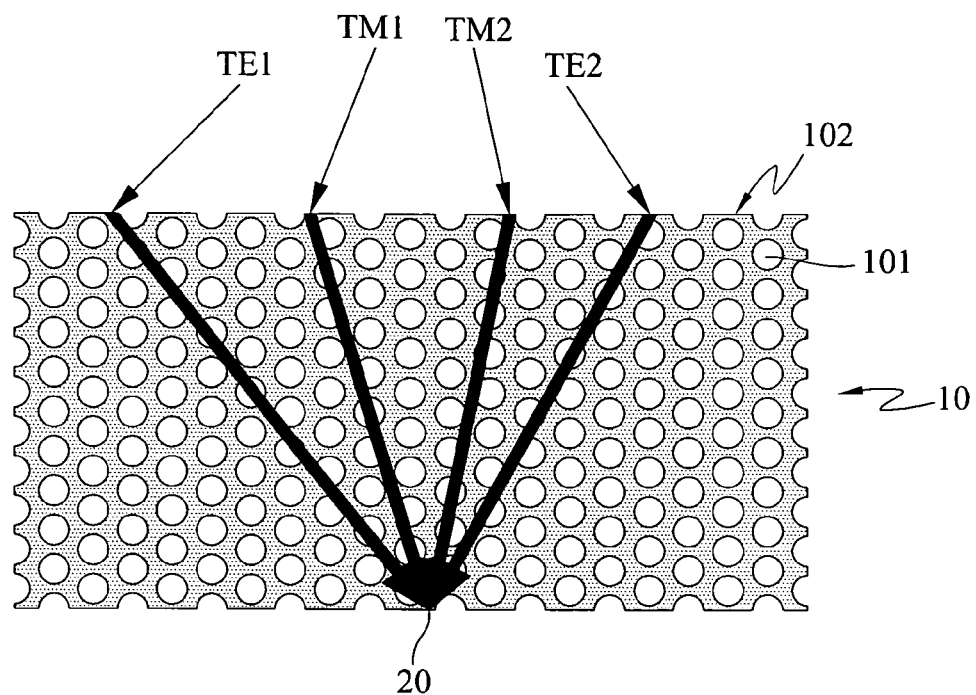
FIGS. 3A, 3B, and 3C are schematic views of the disclosed power polarization beam combiner.

As shown in FIG. 3A, the power polarization beam combiner is a highly dispersive device. For example, the photonic crystal 10 contains several circular vent holes 101 disposed in a periodic hexagonal pattern. Its refractive index satisfy the condition $|n| \leq 7$. In particular, the optical signals TE1 and TE2 are optical signals with the same polarization in the E direction. The optical signals TM1 and TM2 are optical signals with the same polarization in the M direction. Moreover, TE1 and TM1 have the same wavelengths; TE2 and TM2 have the same wavelengths.

Figure 3B:
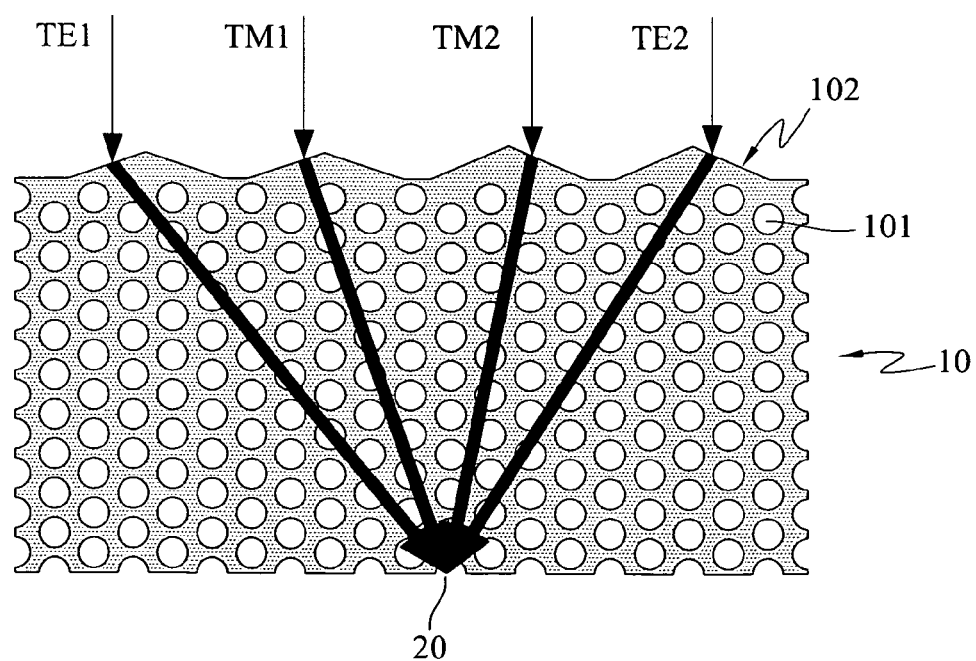
Figure 3C:
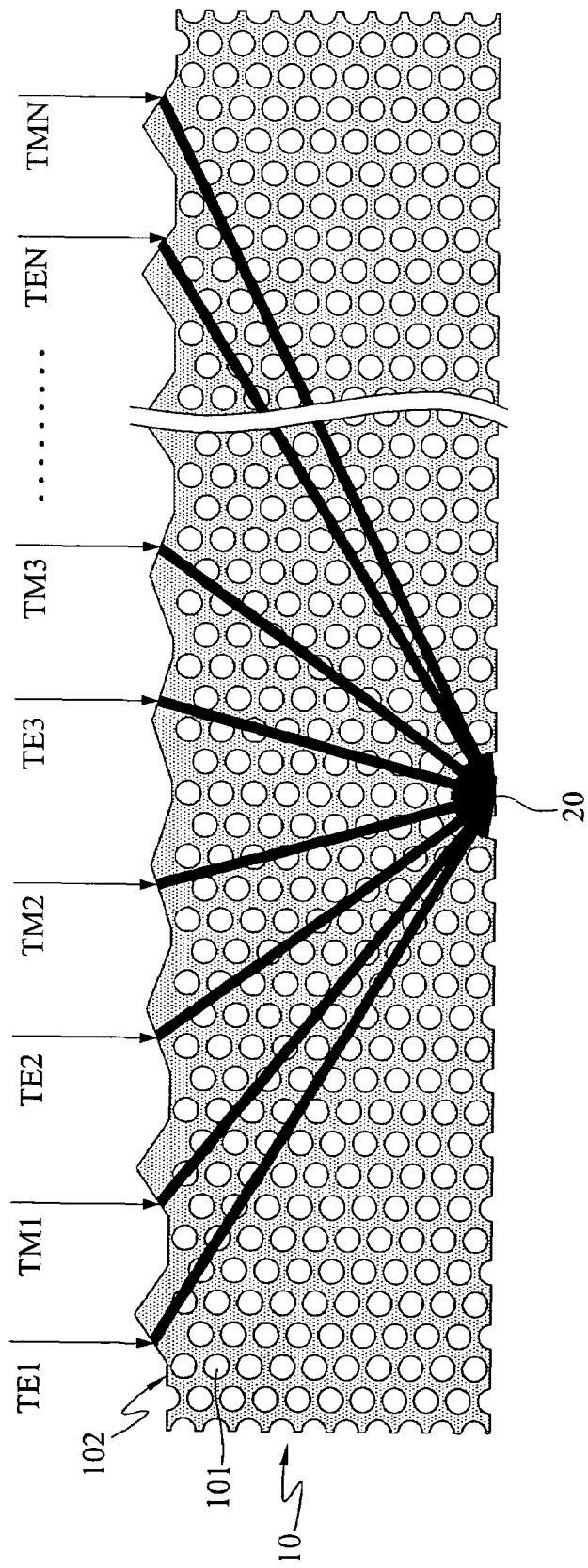

Using the negative refractive index, optical signals TE1, TE2 (or TM1, TM2) of different wavelengths are coupled into a single output port 20. Likewise, optical signals TE1, TM1 (or TE2, TM2) are coupled into the output port 20. Moreover, one can design an incident surface 102 to have different angles using wedge objects, polishing, or etching, in order for optical signals TE1, TM1, TE2, and TM2 to enter the photonic crystal 10 in the parallel direction (see FIG. 3B). Therefore, the disclosed power polarization combiner can be used to couple optical signals of different wavelengths and polarizations. As shown in FIG. 3C, optical signals TE1, TE2, TE3 . . . TEN (or TM1, TM2, TM3 . . . TMN) can be combined into a single output port 20 too. The optical signals TE1, TM1 (or TE2, TM2 or TE3, TM3 or TEN TMN) can also be combined into the output port 20.

Figure 4:
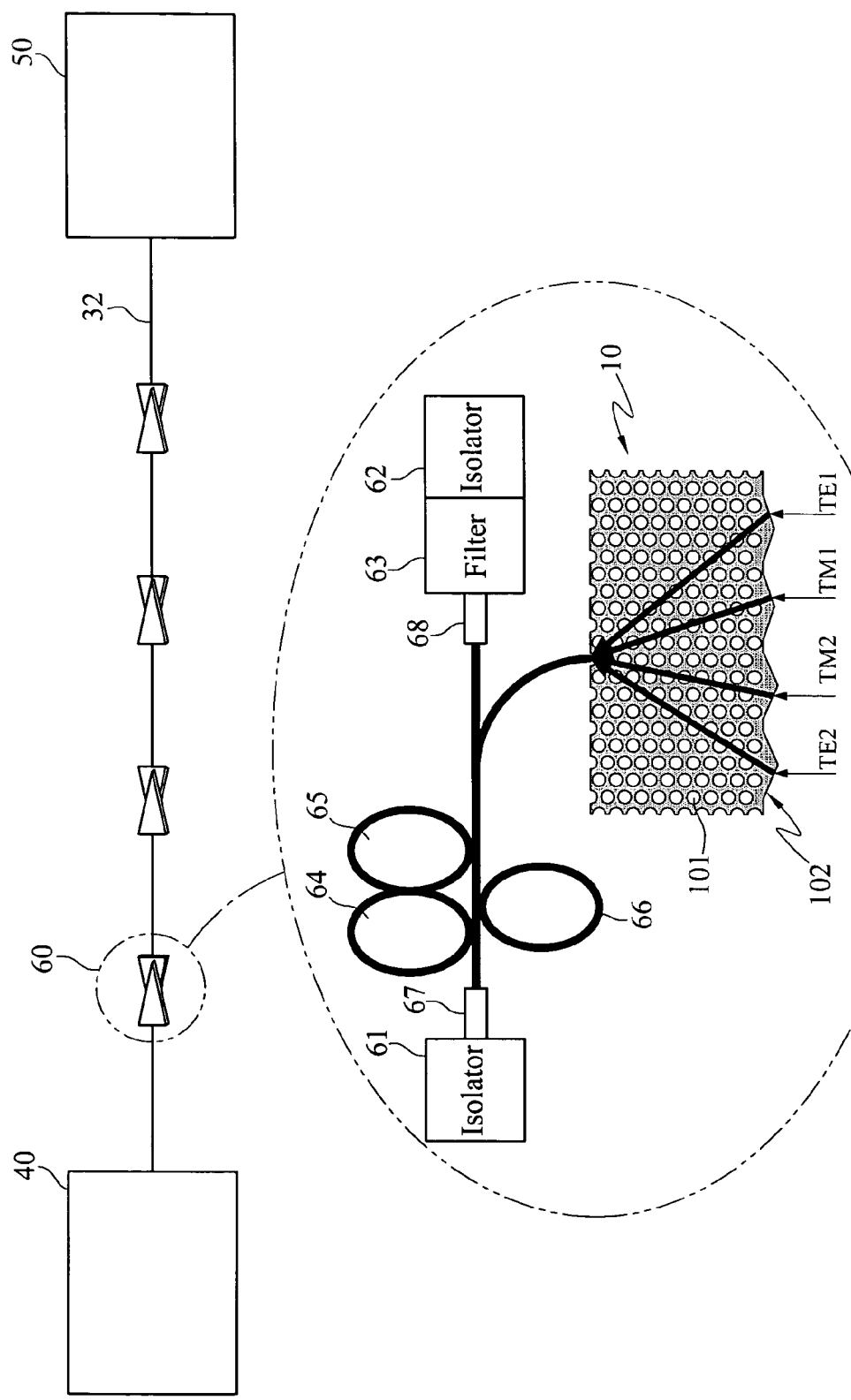
FIG. 4 is a schematic view of the disclosed MDW fiber network system.

When using the above-mentioned power polarization combiner in fiber communications, as shown in FIG. 4, the system contains an optical receiving module 40, an optical transmitting module 50, a fiber 32, and a plurality of laser amplifiers 60. The optical receiving module 40 and the optical transmitting module 50 are connected to both ends of the fiber 32 for transmitting optical signals. The laser amplifiers 60 enhance the power of laser inside the fiber 32. Each laser amplifier 60 consists of two isolators 61, 62 on both ends and a filter 63 to prevent reverse transmission of the optical signals. They are coupled by two couplers 67, 68. Two erbium-doped fibers (EDF) 64, 65 and a dispersion compensation fiber (DCF) 66 are employed to enhance the power and compensate for signal decays. It further uses the above-mentioned power polarization beam coupler as the pump source of the EDF 67, 68. For example, suppose there are only five pump sources available. With beams of different polarizations, the disclosed laser amplifier 60 can combine 10 different optical signals to increase the power by about a factor of two.

Figure 5A:
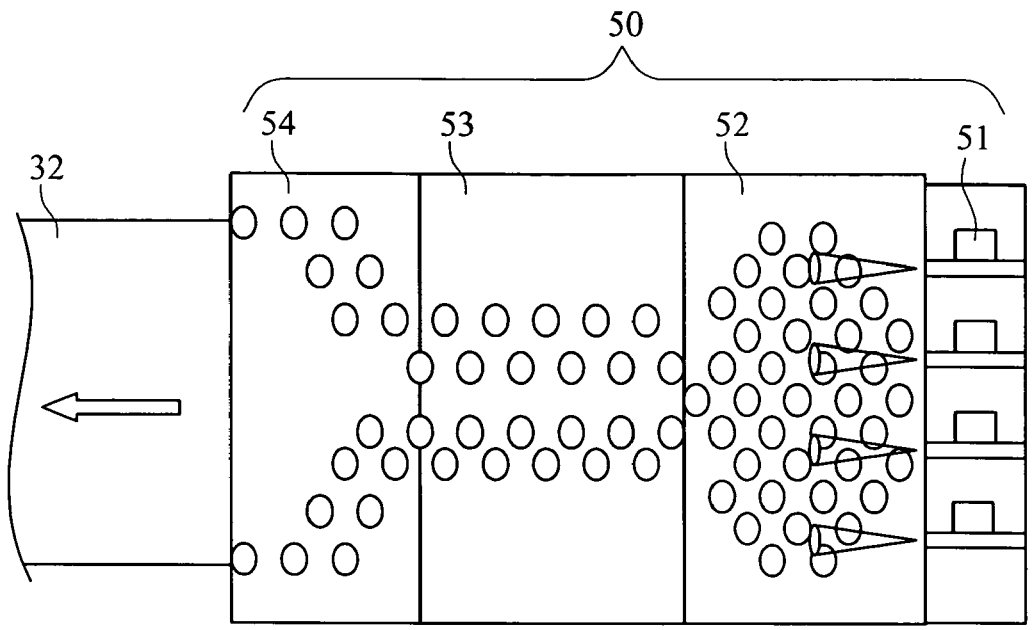
FIG. 5A is a schematic view of the disclosed optical transmitting module.

On the other hand, the invention uses the idea of negative refractive index on the optical transmitting module 50. As shown in FIG. 5A, it contains several light emitters 51, a superprism 52, a waveguide 53, and a spot size converter 54. The light emitters 51 receive an external signal, modulate it and emit an optical signal into the superprism 52. The superprism 52 can couple several optical signals of different wavelengths and polarizations into the waveguide 53. The optical signal is thus guided into the spot size converter 54, entering the fiber 32. Likewise, the superprism 52 has the above-mentioned photonic crystal design so that the volume of the optical transmitting module 50 can be compactly integrated. The waveguide 53 can be a photonic crystal waveguide to further minimize the size.

Figure 5B:
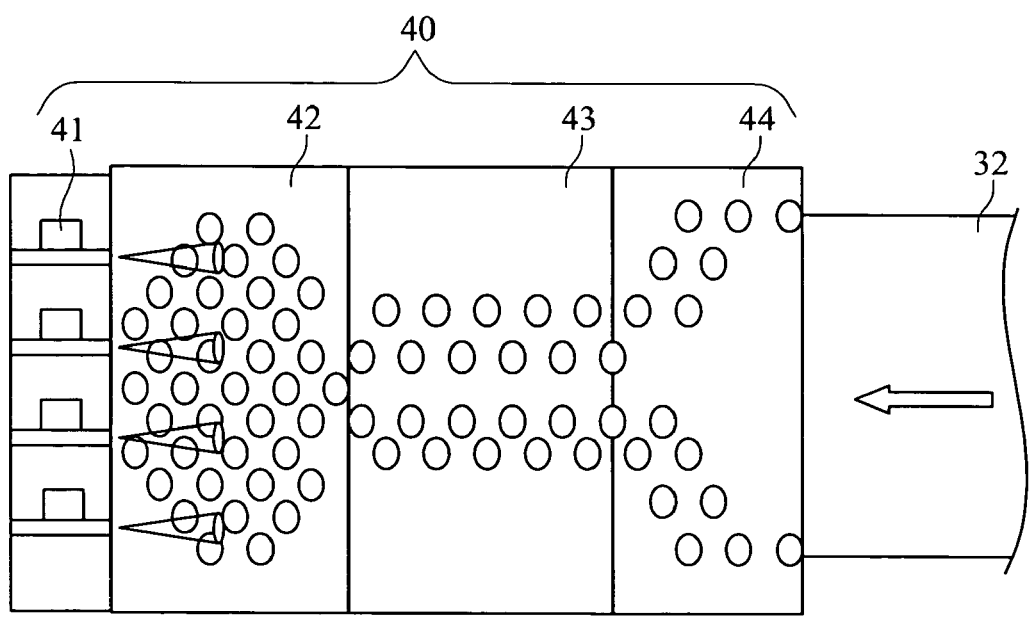
FIG. 5B is a schematic view of the disclosed optical receiving module.

As shown in FIG. 5B, the optical receiving module 40 contains several light receivers 41, a superprism 42, a waveguide 43, and a spot size converter 44. The optical signal enters the spot size converter 44 from the fiber 32. Guided by the waveguide 43, the optical signal is split by the superprism 42 into respective light receivers 41. Likewise, the superprism 42 has the above-mentioned photonic crystal design so that the volume of the optical transmitting module 40 can be compactly integrated. The waveguide 43 can be a photonic crystal waveguide to further minimize the size.

Certain variations would be apparent to those skilled in the art, which variations are considered within the spirit and scope of the claimed invention.

What is claimed is:

1. A power polarization beam combiner as a highly dispersive device to combine a plurality of optical signals with different wavelengths and polarizations, wherein its refractive index n satisfies the condition: $|n| \leq 7$.

2. The power polarization beam combiner of claim 1, wherein the highly dispersive device is a photonic crystal with a negative refractive index.

3. The power polarization beam combiner of claim 2, wherein the photonic crystal contains a plurality of vent holes.

4. The power polarization beam combiner of claim 3, wherein the vent holes are disposed in a hexagonal pattern.

5. The power polarization beam combiner of claim 1, wherein the surface for receiving the optical signal has a plurality of incident faces at different angles for light to enter in parallel.

6. A multi-wavelength fiber network system containing an optical transmitting module, a fiber, and an optical receiving module in connection for an optical signal to be emitted by the optical transmitting module, transmitted by the fiber, and received by the optical receiving module, wherein the optical transmitting module comprises:

a plurality of light emitters, each of which receives an external signal and modulates it into the optical signal;

a superprism, which is connected to the light emitters for combining the optical signals of different wavelengths and polarizations and is a highly dispersive device with a refractive index n satisfying $|n| \leq 7$;

a waveguide, which is connected to the superprism for guiding and outputting the optical signal; and a spot size converter, which is connected to the photonic crystal waveguide and coupled to the fiber for coupling the optical signal to the fiber.

7. The multi-wavelength fiber network system of claim 6, wherein the highly dispersive device is a photonic crystal with a negative refractive index.

8. The multi-wavelength fiber network system of claim 7, wherein the photonic crystal contains a plurality of vent holes.

9. The multi-wavelength fiber network system of claim 8, wherein the vent holes are disposed in a hexagonal pattern.

10. The multi-wavelength fiber network system of claim 6, wherein the surface on the power polarization beam combiner for receiving the optical signal has a plurality of incident faces at different angles for light to enter in parallel.

11. A multi-wavelength fiber network system comprising an optical transmitting module, a fiber, an optical receiving module, and a laser amplifier in connection, an optical signal being emitted by the optical transmitting module, transmitted by the fiber, received by the optical receiving module, and amplified by the laser amplifier, wherein the laser amplifier uses a power polarization beam combiner to combine a plurality of optical signals with different wavelengths and polarizations, the power polarization beam combiner being a highly dispersive device with a refractive index n satisfying $|n| \leq 7$.

12. The multi-wavelength fiber network system of claim 11, wherein the highly dispersive device is a photonic crystal with a negative refractive index.

13. The multi-wavelength fiber network system of claim 12, wherein the photonic crystal contains a plurality of vent holes.

14. The multi-wavelength fiber network system of claim 13, wherein the vent holes are disposed in a hexagonal pattern.

15. The multi-wavelength fiber network system of claim 11, wherein the surface on the power polarization beam combiner for receiving the optical signal has a plurality of incident faces at different angles for light to enter in parallel.

* * * * *